(12) United States Patent
Onodera

(10) Patent No.: US 7,533,657 B2
(45) Date of Patent: May 19, 2009

(54) OPEN/CLOSE CONTROLLER OF INTAKE AND EXHAUST COMMUNICATION CIRCUIT

(75) Inventor: Yasuyuki Onodera, Oyama (JP)

(73) Assignee: Komatsu Ltd., Tokyo (JP)

( * ) Notice: Subject to any disclaimer, the term of this patent is extended or adjusted under 35 U.S.C. 154(b) by 0 days.

(21) Appl. No.: 11/659,676

(22) PCT Filed: Aug. 11, 2005

(86) PCT No.: PCT/JP2005/014763

§ 371 (c)(1),
(2), (4) Date: Feb. 7, 2007

(87) PCT Pub. No.: WO2006/016654

PCT Pub. Date: Feb. 16, 2006

(65) Prior Publication Data

US 2007/0262283 A1 Nov. 15, 2007

(30) Foreign Application Priority Data

Aug. 11, 2004 (JP) .............................. 2004-234750

(51) Int. Cl.
*F02M 25/07* (2006.01)
(52) U.S. Cl. ............................ 123/568.11; 123/568.21; 123/559.2; 60/605.2
(58) Field of Classification Search ............ 123/568.11, 123/568.21, 559.2; 60/605.2
See application file for complete search history.

(56) References Cited

U.S. PATENT DOCUMENTS

| | | | |
|---|---|---|---|
| 4,426,848 A * | 1/1984 | Stachowicz | 123/568.12 |
| 5,406,796 A | 4/1995 | Hiereth et al. | |
| 5,724,813 A * | 3/1998 | Fenelon et al. | 60/606 |
| 6,276,139 B1 * | 8/2001 | Moraal et al. | 60/605.2 |
| 6,286,312 B1 * | 9/2001 | Bertilsson | 60/605.2 |
| 6,295,816 B1 * | 10/2001 | Gallagher et al. | 60/611 |
| 6,470,864 B2 | 10/2002 | Kim et al. | |
| 6,564,784 B1 | 5/2003 | Onodera et al. | |
| 6,701,710 B1 * | 3/2004 | Ahrens et al. | 60/605.2 |
| 6,725,660 B2 | 4/2004 | Hidaka | |

(Continued)

FOREIGN PATENT DOCUMENTS

| | | |
|---|---|---|
| FR | 2864994 A1 | 7/2005 |
| JP | 54-93621 U | 12/1952 |
| JP | 5-172008 A | 7/1993 |
| JP | 9-112287 A | 4/1997 |
| JP | 11-93781 A | 4/1999 |

(Continued)

OTHER PUBLICATIONS

Notification Concerning Transmittal of International Preliminary Report on Patentability, Chapter II of the Patent Cooperation Treaty, undated, for PCT/JP2005/014763, 5 sheets.

*Primary Examiner*—Erick Solis
(74) *Attorney, Agent, or Firm*—Frishauf, Holtz, Goodman & Chick, P.C.

(57) ABSTRACT

In an open/close control device 40 installed in a diesel engine 1, when a rotational speed N of the diesel engine 1 is equal to or higher than an intermediate rotational speed and a fuel injection amount is equal to or less than an idling injection amount Fi, a control portion 33 of a valve opening and closing controlling means 30 determines that the diesel engine is in such a state that engine brake is to be actuated, and controls to close both a bypass valve 24 and an EGR valve 52. Accordingly, since there is no fear that exhaust gas returns from an inlet line side of an exhaust turbine 22 to an outlet line side of a compressor 21, the engine brake can be effectively actuated during running at high speeds and running on a downward slope.

4 Claims, 6 Drawing Sheets

U.S. PATENT DOCUMENTS

| | | | |
|---|---|---|---|
| 7,010,914 B1 * | 3/2006 | Roberts et al. | 60/600 |
| 2007/0262283 A1 | 11/2007 | Onodera | |
| 2008/0134677 A1 | 6/2008 | Onodera | |

FOREIGN PATENT DOCUMENTS

| | | |
|---|---|---|
| JP | 2000-64844 A | 2/2000 |
| JP | 2001-165000 A | 6/2001 |
| JP | 2003-201849 A | 7/2003 |
| JP | 2004-027897 A | 1/2004 |
| JP | 2004-263578 A | 9/2004 |
| JP | 2005-214153 A | 8/2005 |

* cited by examiner

OPEN/CLOSE CONTROLLER OF INTAKE AND EXHAUST COMMUNICATION CIRCUIT

This application is a U.S.National Phase Application under 35 USC 371 of International Application PCT/JP2005/014763 filed Aug. 11, 2005.

TECHNICAL FIELD

The present invention relates to an open/close control device for an intake-exhaust communication line, and more particularly, to an open/close control device for an internal combustion engine having an intake-exhaust communication line through which an intake side and an exhaust side of the internal combustion engine communicate with each other.

BACKGROUND ART

Some internal combustion engines such as gasoline engines and diesel engines are equipped with turbochargers. A turbocharger rotates a turbine using a pressure of exhaust gas from an engine, and drives a compressor with the aid of a rotational force of the turbine to supercharge the engine. An engine thus equipped with a turbocharger includes one equipped with a bypass line through which an outlet line of a compressor and an inlet line of a turbine communicate with each other (e.g., Patent Document 1).

The engine equipped with this bypass line is provided to efficiently operate an exhaust gas recirculation (EGR) system. An EGR system recirculates part of exhaust gas containing inert gases into intake air for a diesel engine so as to slow down combustion and reduce a combustion temperature in the diesel engine, thereby suppressing generation of nitrogen oxides (NOx) in exhaust gas. In this case, when a supply air pressure is higher than an exhaust pressure in the engine and hence exhaust gas is unlikely to flow to a supply air side, a bypass circuit is opened to cause part of intake air to flow into an exhaust pipe, thereby reducing the supply air pressure and facilitating exhaust gas recirculation. The control as described above is performed to make it possible to efficiently carry out EGR.

[Patent Document 1] JP 2001-165000 A (pages 9 to 10, FIG. 1)

DISCLOSURE OF THE INVENTION

Problems to be Solved by the Invention

In a vehicle mounted with an engine, engine brake may be actuated while the vehicle is running. Engine brake may be used in the following situations. In the case of, for example, a passenger vehicle or a cargo truck, engine brake is actuated by intentionally downshifting a transmission while running at high speed or running downhill. In this case, engine brake is relatively frequently used for the purpose of deceleration. Even when a driver has no intention of actuating engine brake, the engine brake may take effect under a certain running condition. Further, in the case of a construction machine such as a bulldozer or the like as well, an excessive increase in vehicle speed may be caused due to an unexpected slant in a case of running on an irregular ground. Engine brake is utilized in such a situation as well.

In the engine equipped with the EGR system and the bypass circuit as described above, however, the supply air side and the exhaust side communicate with each other while the EGR system is in operation or while the bypass circuit is open to cause the EGR system to work efficiently. Therefore, even if an attempt is made to actuate engine brake in this situation, exhaust gas (which hardly contains combustion gas) circulates in vain through a recirculation conduit for EGR or flows backward through a bypass conduit. Thus, there is a problem in that engine brake does not work effectively.

It is an object of the present invention to provide an open/close control device for an intake-exhaust communication line which makes it possible to actuate engine brake effectively even in the case of an internal combustion engine provided with an EGR system or a bypass line.

Means for Solving the Problems

An open/close control device for an intake-exhaust communication line according to claim 1 of the present invention is characterized in that: the intake-exhaust communication line is equipped with an exhaust gas recirculation line for extracting part of exhaust gas in an internal combustion engine to recirculate the extracted exhaust gas to a supply air side; and the open/close control device is equipped with: an open-close valve provided in the exhaust gas recirculation line; and a valve opening and closing controlling means for controlling the open-close valve in a closing direction when it is determined that a rotational speed of the internal combustion engine is equal to or higher than an intermediate rotational speed and that a fuel injection amount of the internal combustion engine is equal to or smaller than a fuel injection amount required for autonomous operation thereof.

An open/close control device for an intake-exhaust communication line according to claim 2 of the present invention is characterized in that: the intake-exhaust coommunication circuit is equipped with: a turbocharger having a compressor for sucking in and pressurizing fresh air to supply an internal combustion engine therewith and an exhaust turbine for driving the compressor; and an exhaust gas recirculation line for extracting part of exhaust gas from an inlet line side of the exhaust turbine to recirculate the extracted exhaust gas to an outlet line side of the compressor; and the open/close control device is equipped with: an open-close valve provided in the exhaust gas recirculation line; and a valve opening and closing controlling means for controlling the open-close valve in a closing direction when it is determined that a rotational speed of the internal combustion engine is equal to or higher than an intermediate rotational speed and that a fuel injection amount of the internal combustion engine is equal to or smaller than a fuel injection amount required for autonomous operation thereof.

An open/close control device for an intake-exhaust communication line according to claim 3 of the present invention is characterized in that: the intake-exhaust communication line is equipped with: a turbocharger having a compressor for sucking in and pressurizing fresh air to supply an internal combustion engine therewith and an exhaust turbine for driving the compressor; and a bypass line through which an outlet line of the compressor and an inlet line of the exhaust turbine communicate with each other; and the open/close control device is equipped with: an open-close valve provided in the bypass line; and a valve opening and closing controlling means for controlling the open-close valve in a closing direction when it is determined that a rotational speed of the internal combustion engine is equal to or higher than an intermediate rotational speed and that a fuel injection amount of the internal combustion engine is equal to or smaller than a fuel injection amount required for autonomous operation thereof.

An open/close control device for an intake-exhaust communication line according to claim 4 of the present invention is characterized in that: the intake-exhaust communication line is equipped with: a turbocharger having a compressor for sucking in and pressurizing fresh air to supply an internal combustion engine therewith and an exhaust turbine for driving the compressor; an exhaust gas recirculation line for extracting part of exhaust gas from an inlet line side of the exhaust turbine to recirculate the extracted exhaust gas to an outlet line side of the compressor; and a bypass line through which an outlet line of the compressor and an inlet line of the exhaust turbine communicate with each other; and the open/close control device is equipped with: an open-close valve provided in the exhaust gas recirculation line; another open-close valve provided in the bypass line; and a valve opening and closing controlling means for controlling both of the open-close valve and the another open-close valve in a closing direction when it is determined that a rotational speed of the internal combustion engine is equal to or higher than an intermediate rotational speed and that a fuel injection amount of the internal combustion engine is equal to or smaller than a fuel injection amount required for autonomous operation thereof.

In the foregoing description, the expression "equal to or higher than an intermediate rotational speed" means a range covering about 200 rpm around a torque point. The expression "equal to or smaller than a fuel injection amount required for autonomous operation thereof" means a fuel injection amount equal to or smaller than a fuel injection amount required for the maintenance of an idling state. This expression also refers to a case where the engine is dragged due to rotation on a driven side thereof (e.g., rotation on a wheel side) so that the idling state is maintained even without fuel supply, namely, a case where the fuel injection amount is zero.

Effect of Invention

According to any one of claims 1 to 4 of the present invention, the actuation of engine brake is intended in the internal combustion engine when the rotational speed of the internal combustion engine is equal to or higher than the intermediate rotational speed and the fuel injection amount is equal to or smaller than the injection amount required for the maintenance of idling. Accordingly, the valve opening and closing controlling means performs control to close the open-close valve in the EGR system and the open-close valve in the bypass line in such a state, so exhaust gas does not circulate in vain between the exhaust side and the supply air side in the internal combustion engine. As a result, engine brake works effectively.

EXPLANATION OF CODES

1 . . . diesel engine serving as internal combustion engine, 13 . . . operating condition detecting means, 20 . . . turbocharger serving as turbocharger, 21 . . . compressor, 22 . . . exhaust turbine, 23 . . . bypass line constituting intake exhaust communication circuit, 24 . . . bypass valve serving as open-close valve, 30 . . . valve opening and closing controlling means, 40 . . . open/close control device, 51 . . . exhaust gas recirculation line constituting intake exhaust communication circuit, 52 . . . exhaust gas recirculation (EGR) valve serving as open-close valve, Fi . . . fuel injection amount enough for an internal combustion engine to perform autonomous operation, Nm . . . intermediate rotational speed

BEST MODE FOR CARRYING OUT THE INVENTION

The respective embodiments of the present invention will be described hereinafter based on the drawings. In second to fourth embodiments of the present invention to be described later, components identical to or components having similar functions to those of a first embodiment of the present invention, which will be described below, are denoted by the same reference symbols, and the description of those components will be simplified or omitted.

First Embodiment

Figure 1:
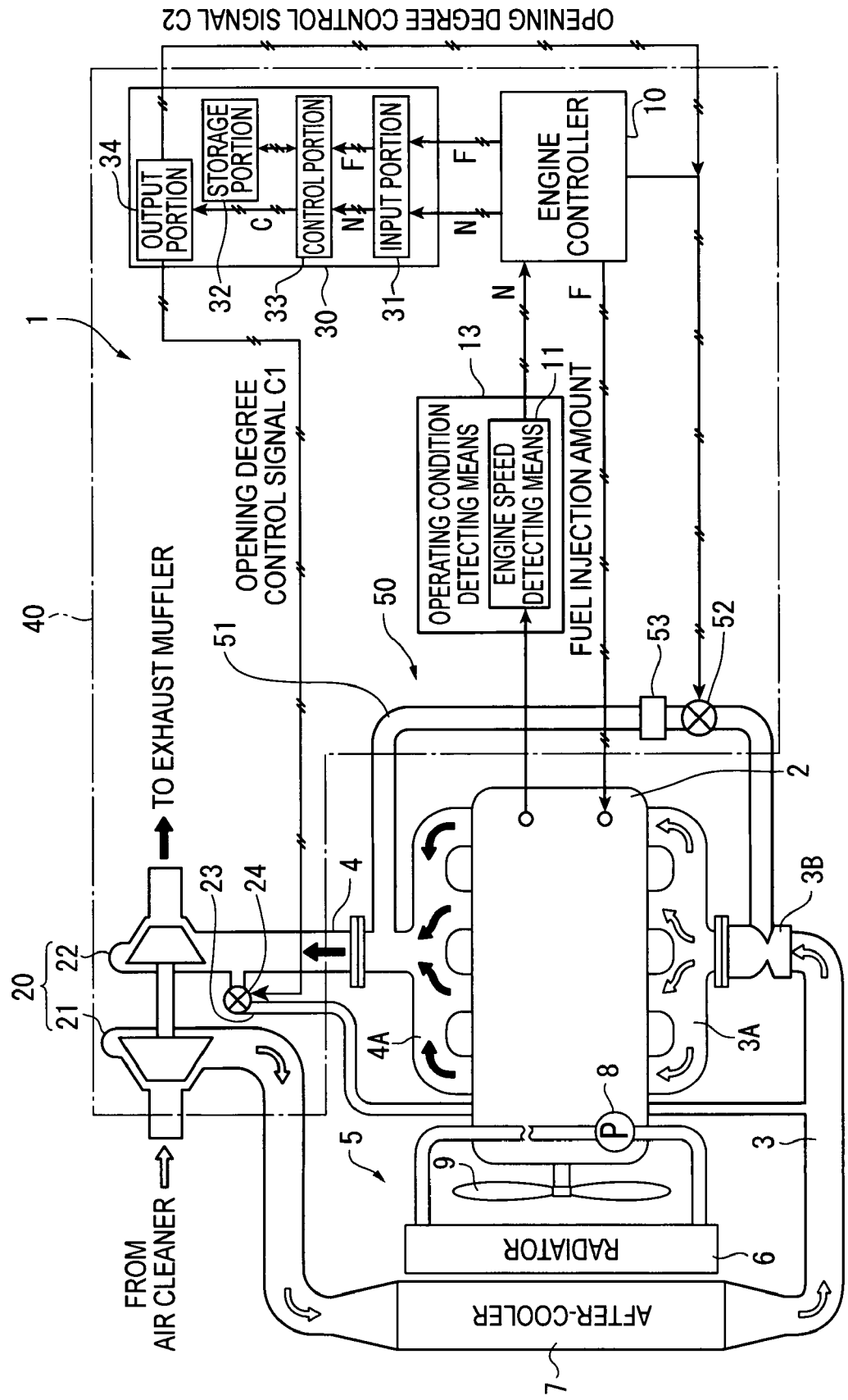
FIG. 1 is a schematic diagram showing an internal combustion engine provided with an open/close control device according to a first embodiment of the present invention.

FIG. 1 is a schematic diagram showing a diesel engine (internal combustion engine) 1 according to the first embodiment of the present invention. Referring to FIG. 1, the diesel engine 1 is equipped with an engine 2 having a plurality of (four in this embodiment of the present invention) combustion chambers formed therein, an intake pipe 3 for supplying the combustion chambers with supply air, an exhaust pipe 4 for discharging exhaust gas to the outside of the combustion chambers, a cooling system 5 for cooling the diesel engine 1, an engine controller 10 for controlling the operation of the engine 2, a turbocharger (turbocharger) 20 for compressing supply air to supercharge the engine 2, and an exhaust gas recirculation system ("exhaust gas recirculation" may be hereinafter referred to as EGR) 50 for reducing the discharge amount of NOx.

An intake manifold 3A is mounted between the intake pipe 3 and the engine 2 so that supply air from the intake pipe 3 is distributed to the respective combustion chambers.

An exhaust manifold 4A is mounted between the engine 2 and the exhaust pipe 4 so that masses of exhaust gas from the respective combustion chambers flow together into the exhaust pipe 4.

The cooling system 5 is equipped with a pump 8, which is driven by, for example, a crankshaft (not shown) accommodated in the engine 2. Coolant force-fed by the pump 8 cools cooling requiring sections of the diesel engine 1 such as the engine 2, the turbocharger 20, and an oil cooler (not shown), and then is cooled by a radiator 6 provided in the cooling system 5. An after-cooler 7 for cooling air compressed by the turbocharger 20 is provided in a midway portion of the intake pipe 3.

The radiator 6 and the after-cooler 7 are provided in the engine 2. The cooling operations of the radiator 6 and the after-cooler 7 are promoted by a fan 9, which is rotationally driven by the crankshaft or the like.

An engine controller 10 is connected to an operating condition detecting means 13 equipped with an engine speed detecting means 11 for detecting a rotational speed of the engine 2, an accelerator opening degree (throttle opening degree) detecting means (not shown), an engine coolant temperature detecting means, a detecting means for detecting a temperature of gas within an intake manifold, and the like. The engine controller 10 acquires detection signals of those detectors from the operating condition detecting means 13. The engine controller 10 calculates from the detection signals a fuel injection amount, a fuel injection timing, and the like for each of the combustion chambers such that the operation of the diesel engine 1 is optimized, and performs the control of, for example, outputting those calculated values to a fuel injection device (not shown) as command values.

Adoptable as the engine speed detecting means 11 is, for example, a detector for detecting a rotational speed of the crankshaft in the engine 2.

The turbocharger 20 is equipped with an exhaust turbine 22 provided in a midway portion of the exhaust pipe 4, and a compressor 21 provided in a midway portion of the intake pipe 3 and coupled to the exhaust turbine 22 to be driven. An outlet line of the compressor 21 in the intake pipe 3 communicates downstream of the after-cooler 7 with an inlet line of the exhaust turbine 22 in the exhaust pipe 4 through a bypass line 23. The bypass line 23 is fitted with a bypass valve (another open-close valve) 24 for adjusting the opening degree of the bypass line 23. A valve of an arbitrary construction such as a needle valve, a butterfly valve, and an electromagnetic valve can be adopted as the bypass valve 24. In this embodiment of the present invention, a two-position control valve for either fully opening or fully closing the bypass line 23 is adopted. A valve opening and closing controlling means 30 for controlling the operation of the bypass valve 24 constructed as described above is connected to the bypass valve 24.

The EGR system 50 is equipped with an exhaust gas recirculation line 51 for extracting part of exhaust gas from the exhaust manifold 4A to recirculate the extracted exhaust gas to the outlet line of the compressor 21, as an intake-exhaust communication line. The EGR passage 51 is provided with an EGR valve (open-close valve) 52 for opening/closing the EGR passage 51, and an EGR cooler 53 for cooling exhaust gas from the exhaust manifold 4A. The EGR passage 51 communicates at an end thereof on the intake pipe 3 side with a narrow portion of a venturi 3B provided in the intake pipe 3, downstream of a branching position of the aforementioned bypass line 23.

The valve opening and closing controlling means 30 will be described hereinafter in detail.

The valve opening and closing controlling means 30, which is connected to the engine controller 10, can receive a detection signal of an engine rotational speed N and a value of a fuel injection amount F from the engine controller 10.

The valve opening and closing controlling means 30 is provided with an input portion 31 for receiving detection signals from the engine controller 10, a memory portion 32 in which an operational state of the diesel engine 1 obtained from the signals input to the input portion 31 is stored as a map, a table, or the like, a control portion 33 for determining optimal opening degrees of the valves 24 and 52 based on the operational state stored in the memory portion 32, and an output portion 34 for outputting opening degree control signals C1 and C2 from the control portion 33 to the valves 24 and 52, respectively.

Figure 2:
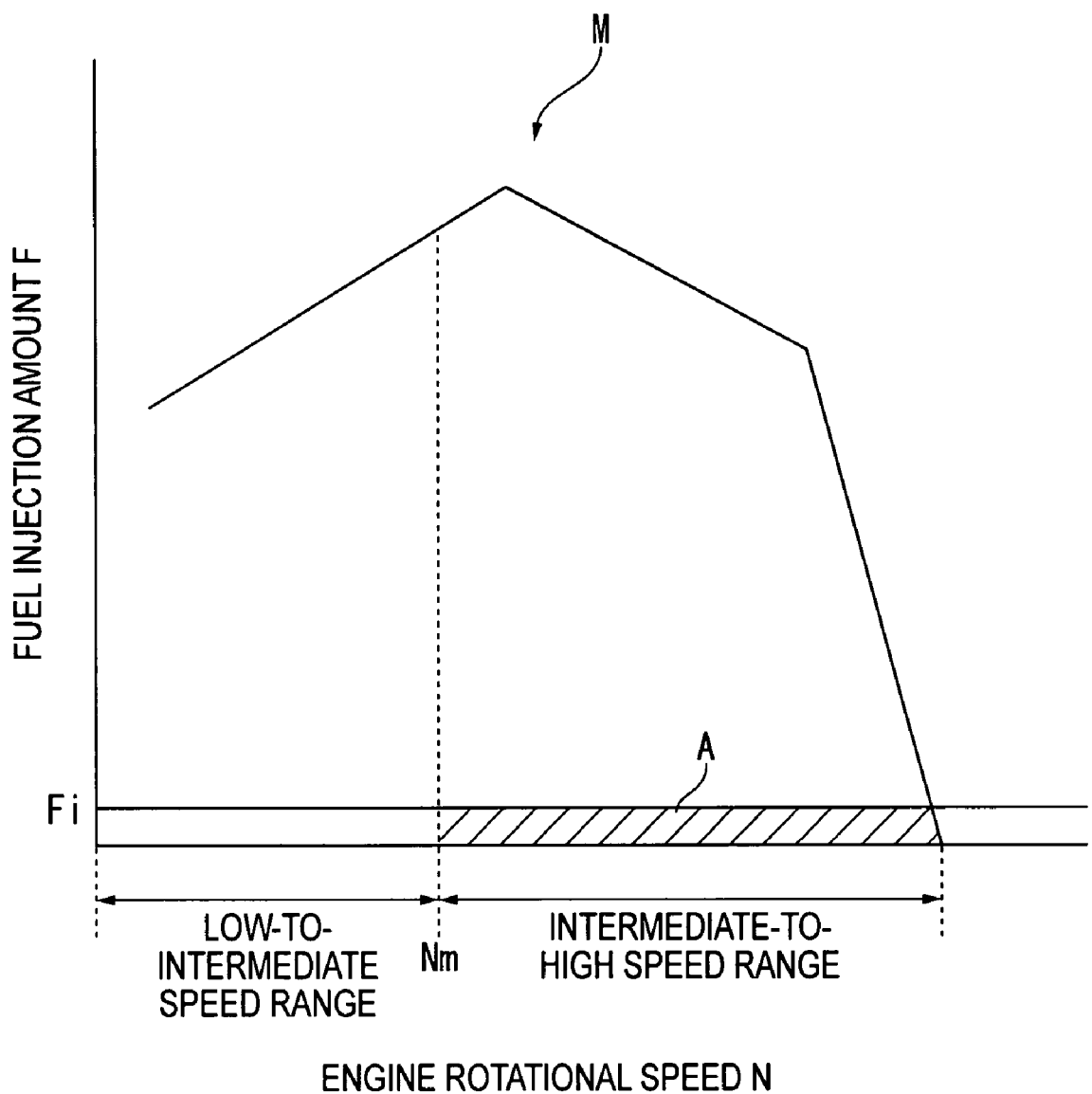
FIG. 2 is a diagram showing an operational state of the internal combustion engine of the first embodiment of the present invention.

As shown in FIG. 2, the memory portion 32 has stored therein a map M indicating the operational state of the diesel engine 1. Referring to the map M, a predetermined region A indicating an operational state of the diesel engine 1 is set on a graph with an axis of abscissa representing the engine rotational speed N and an axis of ordinate representing the fuel injection amount F.

The operational state of the diesel engine 1 in the region A indicates that the engine rotational speed N is equal to or higher than an intermediate rotational speed Nm, and that the fuel injection amount F is equal to or smaller than an idling injection amount Fi. The idling injection amount Fi is a minimum injection amount required for autonomous operation of the diesel engine 1. In some cases, the idling injection amount Fi is zero.

Figure 3:
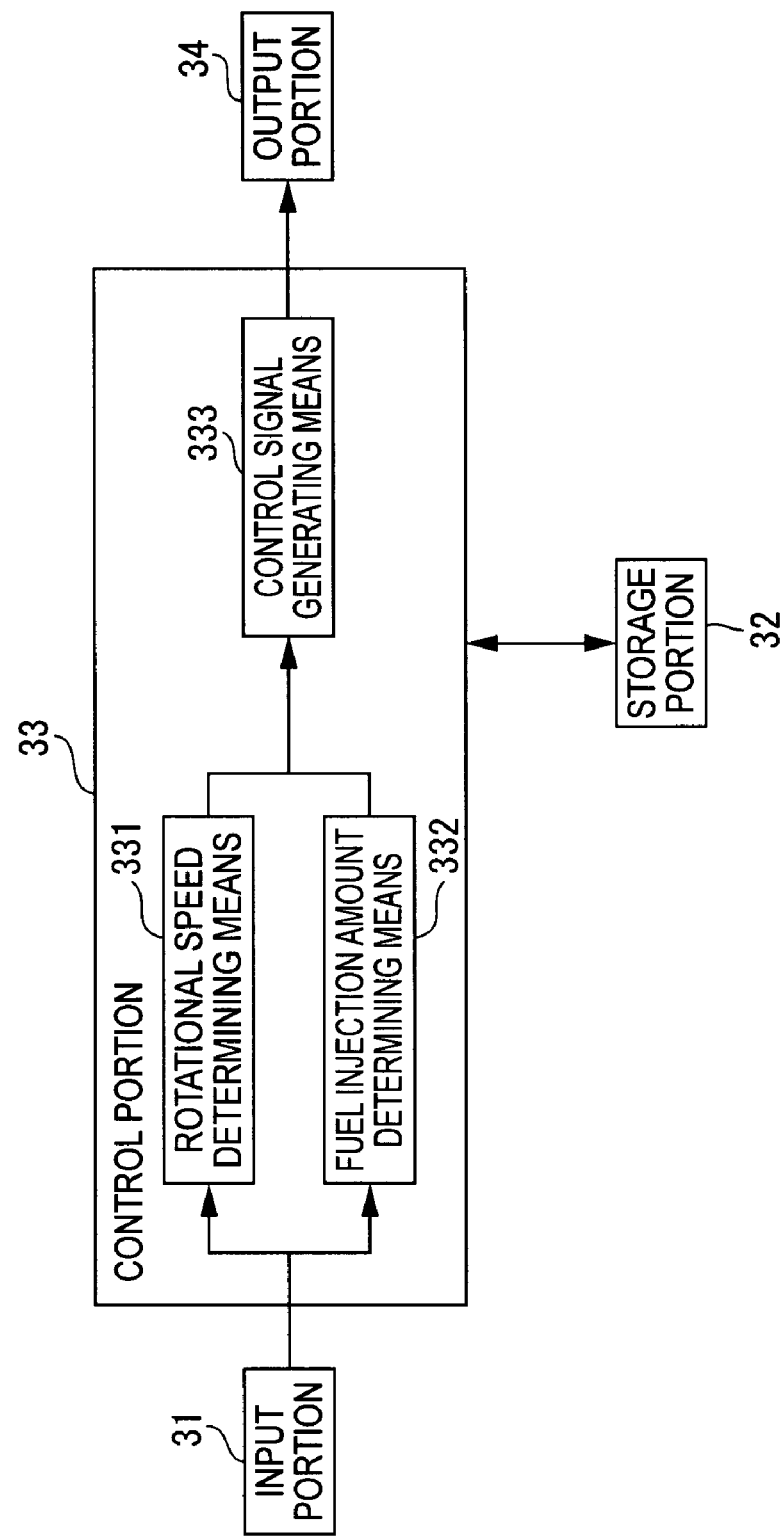
FIG. 3 is a block diagram showing an essential part of the first embodiment of the present invention.

When the operational state is in the region A, the control portion 33 determines that engine brake is to be actuated in the diesel engine 1, and controls the opening degrees of the valves 24 and 52. Thus, as shown in FIG. 3, the control portion 33 is equipped with an engine speed determining means 331 for determining whether or not the rotational speed N of the diesel engine 1 is equal to or higher than the intermediate rotational speed Nm, a fuel injection amount determining means 332 for determining whether or not the fuel injection amount F is equal to or smaller than the idling injection amount Fi, and a control signal generating means 333 for determining, when the rotational speed N is equal to or higher than the intermediate rotational speed Nm and the fuel injection amount F is equal to or smaller than the idling injection amount Fi, that engine brake is to be actuated, and generating the opening degree control signals C1 and C2 for closing both the bypass valve 24 and the EGR valve (EGR/V) 52.

In this embodiment of the present invention described above, the open/close control device 40 according to the present invention is designed to be equipped with the detector 13, the valve opening and closing controlling means 30, and the EGR valve 52 of the EGR system 50. Further, in this embodiment of the present invention, the valve opening and closing controlling means 30 is connected to the operating condition detecting means 13 via the engine controller 10, so the open/close control device 40 is designed to include the engine controller 10 as well.

The open/close control device 40 constructed as described above operates as follows.

First of all, while the diesel engine 1 is in operation, the turbocharger 20 rotates the exhaust turbine 22 through the use of exhaust gas to drive the compressor 21, thereby supercharging the engine 2. The engine controller 10 calculates a fuel injection amount, a fuel injection timing, and the like for each of the combustion chambers such that the operation of the diesel engine 1 is optimized, from signals from the engine speed detecting means 11 for detecting the rotational speed of the engine 2, the accelerator opening degree (throttle opening degree) detecting means (not shown), the engine coolant temperature detecting means, the detecting means for detecting the temperature within the intake manifold, and the like, performs the control of, for example, outputting those calculated values to the fuel injection device (not shown) as command values, and outputs the values of the engine rotational speed N and the fuel injection amount F to the valve opening and closing controlling means 30.

In the valve opening and closing controlling means 30, the input portion 31 receives the values of the engine rotational speed N and the fuel injection amount F from the engine controller 10. The input portion 31 receives those values a plurality of times within a relatively short period of time (e.g., one second or preferably between several tens of milliseconds and several hundreds of milliseconds). Then, the engine speed determining means 331 determines whether or not the rotational speed N of the diesel engine 1 is equal to or higher than the intermediate rotational speed Nm, and the fuel injection amount determining means 332 determines whether or not the fuel injection amount F is equal to or smaller than the idling injection amount Fi. When it turns out as a result of the determinations made by the respective determiners 331 and 332 that the rotational speed N is equal to or higher than the intermediate rotational speed Nm and that the fuel injection amount F is equal to or smaller than the idling injection amount Fi, the control signal generating means 333 determines that the diesel engine 1 is operated within the region A.

In addition, when it is determined that the diesel engine 1 is operated within the region A, the control signal generating means 333 determines that engine brake is to be actuated, and generates and outputs the opening degree control signals C1 and C2 for controlling both the bypass valve 24 and the EGR valve (EGR/V) 52 in the closing direction, thereby holding both the valves 24 and 52 fully closed until the diesel engine 1 departs from the region A. However, when the bypass valve 24 and the EGR valve 52 have been fully closed in advance, the control signal generating means 333 holds both the valves 24 and 52 fully closed. Thus, exhaust gas is prevented from returning to the supply air side through the bypass line 23 and the exhaust gas recirculation line 51, so engine brake works well.

Although not described above, the control of the EGR valve 52, which is originally intended for exhaust gas recirculation, may be performed by either the valve opening and closing controlling means 30 or the engine controller 10.

As described in the background art as well, the bypass line 23 and the bypass valve 24 are provided to ensure that the EGR system 50 works efficiently. When the supply air pressure is higher than the exhaust pressure, the bypass valve 24 is opened to reliably return exhaust gas to the supply air side. Then, the control of the bypass valve 24 is also performed by either of the valve opening and closing controlling means 30 or the engine controller 10.

The embodiment of the present invention described above has the following effects.

(1) That is, according to the open/close control device 40 provided in the diesel engine 1, when the rotational speed N of the diesel engine 1 is equal to or higher than the intermediate rotational speed Nm and the fuel injection amount F is equal to or smaller than the idling injection amount Fi, the control portion 33 of the valve opening and closing controlling means 30 determines that the rotational speed N does not drop even if the fuel injection amount F indicative of an operational state of the diesel engine 1 is reduced, and hence that engine brake is to be actuated. Thus, the control portion 33 performs control to close both the bypass valve 24 and the EGR valve 52, so there is no concern that exhaust gas will return from the inlet line side of the exhaust turbine 22 to the outlet line side of the compressor 21. In consequence, engine brake can be caused to work effectively while running at high speed or running downhill.

(2) In order for the control portion 33 to determine that the operational state of the diesel engine 1 is in the region A, it is appropriate to directly acquire the values of the engine rotational speed N generally used in the engine controller 10 to control the operation of the diesel engine 1 and the fuel injection amount calculated by the engine controller 10. As a result, the control of opening/closing the bypass valve 24 and the EGR valve 52 can be easily performed with a simple logic.

(3) The bypass line 23 branches off from the intake pipe 3 downstream of the after-cooler 7. Therefore, even when exhaust gas has flowed backward to the intake pipe 3 side for some reason, exhaust gas does not flow through the after-cooler 7. Thus, the after-cooler 7 can be prevented from corroding.

Second Embodiment

Figure 4:
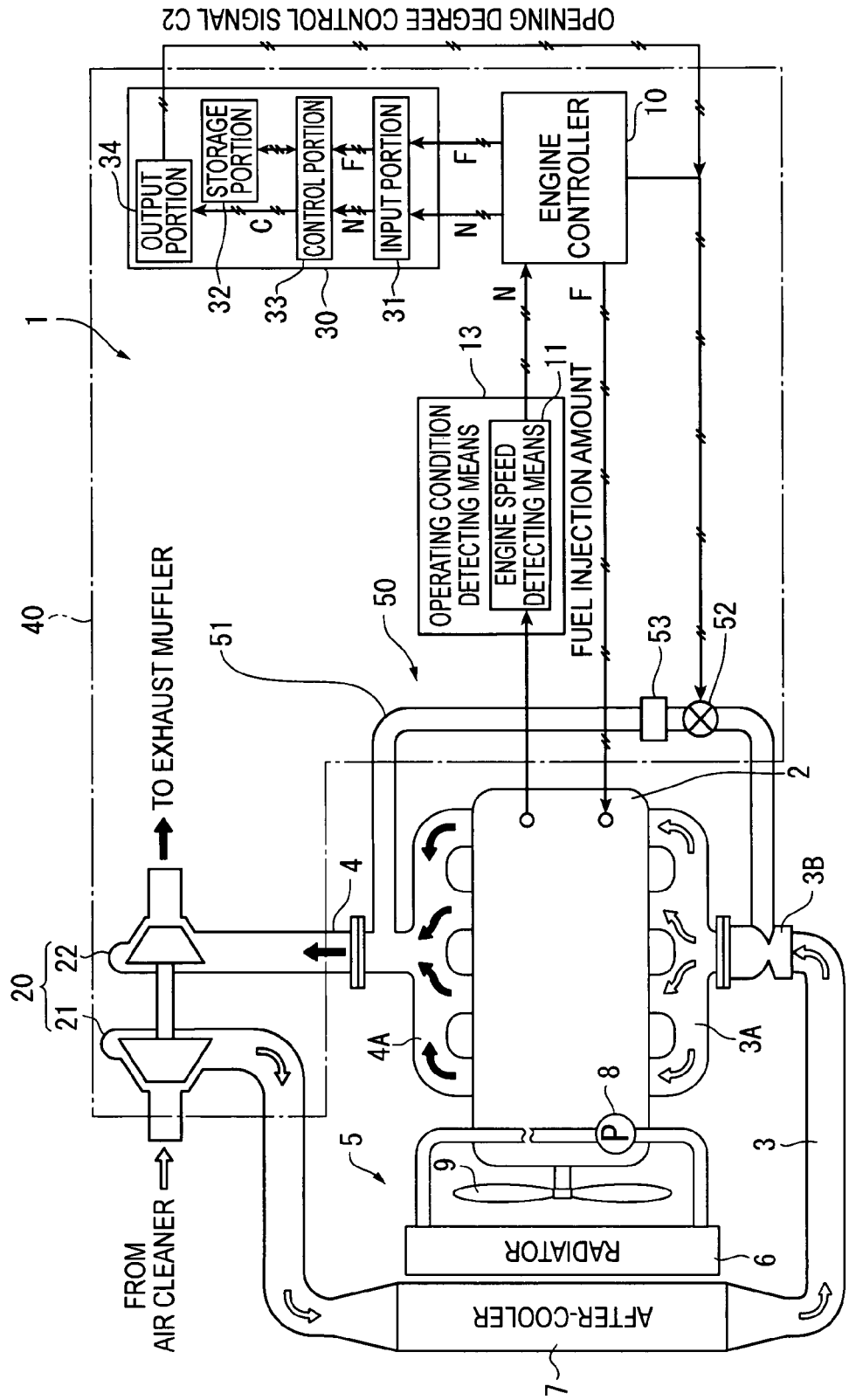
FIG. 4 is a schematic diagram showing an internal combustion engine provided with an open/close control device according to a second embodiment of the present invention.

FIG. 4 is a schematic diagram showing the diesel engine 1 equipped with the open/close control device 40 according to the second embodiment of the present invention.

This embodiment of the present invention is significantly different from the first embodiment of the present invention in that the bypass line 23 and the bypass valve 24 shown in FIG. 1 are not provided. Thus, the opening degree control signal C2 is output from the output portion 34 of the valve opening and closing controlling means 30 only to the EGR valve 52. The opening degree control signal C2 is output at the same timing as in the first embodiment of the present invention.

That is, in this embodiment of the present invention, when the diesel engine 1 is in the operational state in which the rotational speed N is equal to or higher than the intermediate rotational speed Nm and the fuel injection amount F is equal to or smaller than the idling injection amount Fi for making autonomous operation possible, the control portion 33 of the valve opening and closing controlling means 30 determines that engine brake is to be actuated, and fully closes the EGR valve 52 to prevent exhaust gas from returning to the supply air side.

In this embodiment of the present invention structured as described above as well, an effect similar to the item (1) described in the first embodiment of the present invention can be obtained.

Third Embodiment

Figure 5:
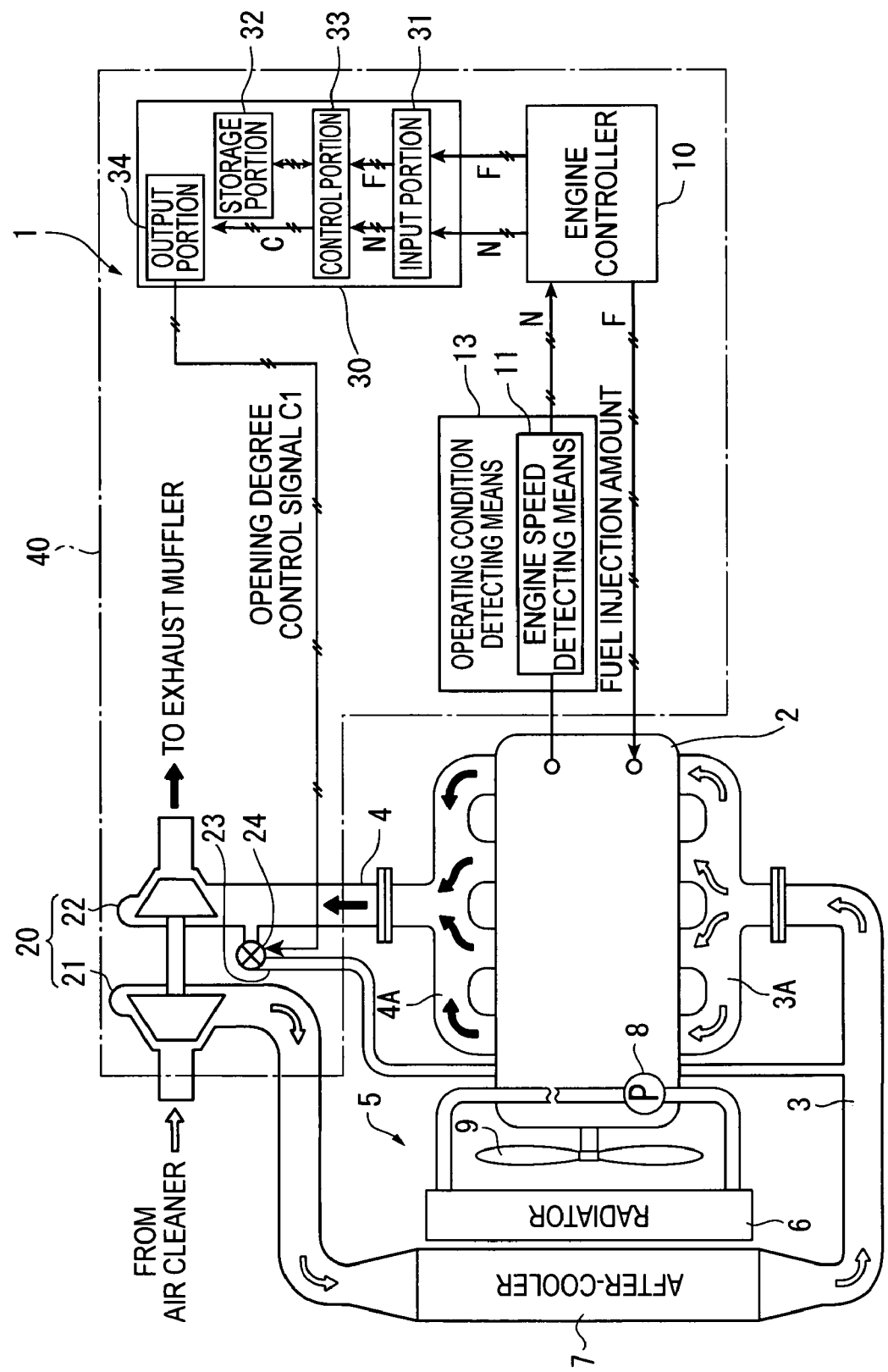
FIG. 5 is a schematic diagram showing an internal combustion engine provided with an open/close control device according to a third embodiment of the present invention.

FIG. 5 is a schematic diagram showing the diesel engine 1 equipped with the open/close control device 40 according to the third embodiment of the present invention. This embodiment of the present invention is significantly different from the first embodiment of the present invention in that the EGR system 50 shown in FIG. 1 is not provided. Thus, the opening degree control signal C1 is output from the output portion 34 of the valve opening controlling means 30 only to the bypass valve 24. The opening degree control signal C1 is output at the same timing as in the first embodiment of the present invention.

In this case, the bypass line 23 and the bypass valve 24 according to this embodiment of the present invention are provided exclusively to prevent the occurrence of surging in the turbocharger 20 and not caused to function as EGR.

That is, when the diesel engine 1 has undergone abrupt deceleration from the operational state in an intermediate-to-high speed range and an intermediate-to-high load range (e.g., when a decelerator pedal is depressed during a dozing operation at intermediate-to-high speed in the case of a bulldozer or when an accelerator pedal is unintentionally returned while running uphill at intermediate-to-high speed in a sediment-loaded state in the case of a dump truck), the fuel injection amount becomes almost equal to zero, so the output of the diesel engine 1 sharply decreases. Therefore, the friction horsepower of the engine, the drag torque of a drive train, and the like serve as brakes, so the rotational speed N rapidly drops.

However, the rotational speed of the turbocharger 20 does not drop immediately but drops slowly owing to the inertia of a rotor assembly thereof even when the rotational speed of the diesel engine 1 has become low and the amount of exhaust gas has become small. Thus, although the turbocharger 20 discharges supply air in an amount corresponding to an intermediate-to-high load, the intake amount of supply air decreases because of the low rotational speed of the diesel engine 1. Accordingly, the throttle degree of an air passage system in the compressor 21 increases, so the operating point of the compressor 21 shifts across a surging critical line and matches on a low flow rate side to cause surging.

On the other hand, if the bypass line 23 and the bypass valve 24 constructed as in this embodiment of the present invention are provided and the valve opening and closing controlling means 30 controls the bypass valve 24 in an opening direction when it is determined that the diesel engine 1 has undergone abrupt deceleration from the operational state in the intermediate-to-high speed range and the intermediate-to-high load range, the throttle degree of the air passage system in the compressor 21 decreases, so the matching characteristic of the compressor 21 shifts to a high flow rate side. Thus, the operating point of the compressor 21 shifts to a matching position on a low rotational speed side through a position located apart from a surging region. As a result, the occurrence of surging is reliably avoided.

In this case, "the intermediate speed range" means a range covering about 200 rpm around the torque point, and "the high speed range" means a rotational speed range higher than "the intermediate speed range". Further, "the intermediate load range" means 30 to 70% of the load at the torque point, and "the high load" means a load higher than "the intermediate load".

In this construction as well, if the bypass valve 24 is fully closed to prevent exhaust gas from returning to the supply air side when the diesel engine 1 is in the operational state in which the rotational speed N is equal to or higher than the intermediate rotational speed Nm and the fuel injection amount F is equal to or smaller than the idling injection amount Fi for making autonomous operation possible, an effect similar to the effect (1) described in the first embodiment of the present invention can be obtained.

Forth Embodiment

Figure 6:
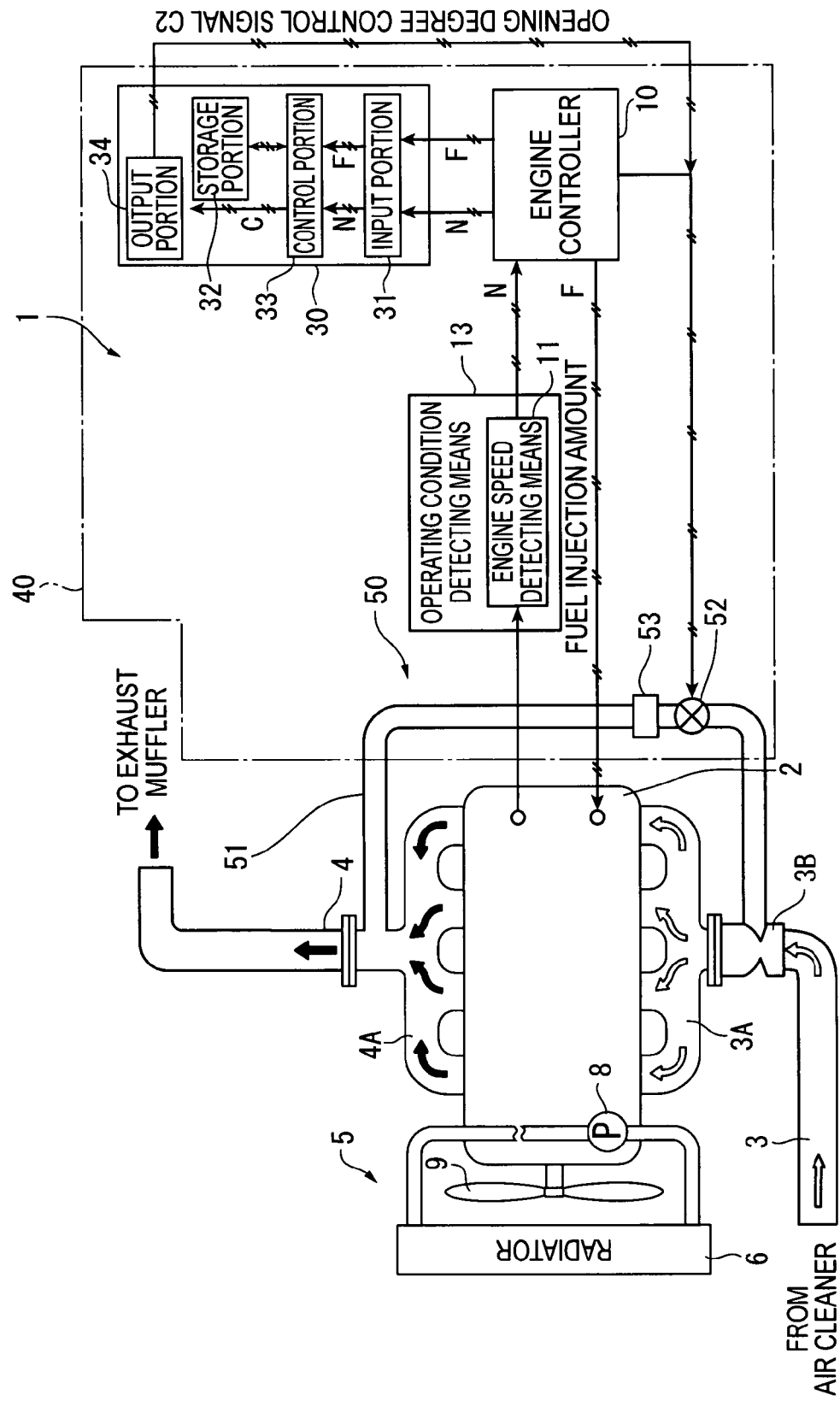
FIG. 6 is a schematic diagram showing an internal combustion engine provided with an open/close control device according to a fourth embodiment of the present invention.

FIG. 6 is a schematic diagram showing the diesel engine 1 equipped with the open/close control device 40 according to the forth embodiment of the present invention.

This embodiment of the present invention is significantly different from the first embodiment of the present invention in that the bypass line 23, the bypass valve 24, the turbocharger 20, and the after-cooler 7 shown in FIG. 1 are not provided. That is, the diesel engine 1 of this embodiment of the present invention is designed to be provided with the EGR system 50 but without turbocharger.

In this case as well, if the control of the EGR valve 52 is performed in the same manner as in the second embodiment of the present invention, the aforementioned effect (1) can be obtained, and the object of the present invention can be achieved.

The present invention is not limited to the aforementioned respective embodiments thereof, but includes other constructions and the like capable of achieving the object thereof. The following modifications and the like are also included in the present invention.

For example, in the aforementioned respective embodiments of the present invention, the bypass valve 24 and the EGR valve 52 are fully closed in actuating engine brake. However, the opening degrees of the bypass valve 24 and the EGR valve 52 may be adjusted in accordance with the actual rotational speed N within the region A.

In the aforementioned respective embodiments of the present invention, the valve opening and closing controlling means 30 is provided separately from the engine controller 10. However, the valve opening and closing controlling means 30 may be integrally provided as, for example, the same MPU as the engine controller 10. In other words, the engine controller 10 may have the function of the valve opening and closing controlling means 30. In this case, the valve opening and closing controlling means of the present invention is constituted by the engine controller 10.

INDUSTRIAL APPLICABILITY

The present invention is applicable not only to open/close control devices provided in diesel engines for construction machines such as bulldozers, wheel loaders, and dump trucks but also to open/close control devices for various diesel engines or gasoline engines each having a flow passage through which an intake side and an exhaust side of an internal combustion engine communicate with each other. Accordingly, the present invention is also applicable to buses, cargo trucks, passenger vehicles, and the like.

The invention claimed is:

1. An open/close control device for an intake-exhaust communication circuit, wherein:
   the intake-exhaust communication circuit is equipped with:
   (i) a turbocharger having a compressor for sucking in and pressurizing fresh air to supply an internal combustion engine therewith and an exhaust turbine for driving the compressor; and
   (ii) a bypass line through which an outlet line of the compressor and an inlet line of the exhaust turbine communicate with each other such that part of intake air in the outlet line of the compressor is able to flow into exhaust air from the engine in the inlet line of the exhaust turbine to thereby reduce a supply air pressure of the exhaust turbine, and
   the open/close control device is equipped with: (i) an open-close valve provided in the bypass line; and (ii) a valve opening and closing controlling means for controlling the open-close valve in a closing direction when it is determined that a rotational speed of the internal combustion engine is equal to or higher than an intermediate rotational speed and that a fuel injection amount of the internal combustion engine is equal to or smaller than a fuel injection amount required for autonomous operation thereof.

2. The open/close control device for an intake-exhaust communication circuit according to claim 1, wherein the inlet line of the turbine, into which the part of the intake air from the outlet line of the compressor is able to flow via the bypass line, is situated between the engine and the turbine.

3. An open/close control device for an intake-exhaust communication circuit, wherein:
   the intake-exhaust communication circuit turbocharger comprises: (i) a compressor for sucking in and pressurizing fresh air to supply an internal combustion engine therewith and an exhaust turbine for driving the compressor; (ii) an exhaust gas recirculation line for extracting part of exhaust gas from an inlet line side of the exhaust turbine to recirculate the extracted exhaust gas to an outlet line side of the compressor; and (iii) a bypass line through which an outlet line of the compressor and an inlet line of the exhaust turbine communicate with each other such that part of intake air in the outlet line of the compressor is able to flow into exhaust air from the engine in the inlet line of the exhaust turbine to thereby reduce a supply air pressure of the exhaust turbine, and
   the open/close control device is equipped with: (i) an open-close valve provided in the exhaust gas recirculation line; (ii) another open-close valve provided in the bypass line; and (iii) a valve opening and closing controlling means for controlling both of the open-close valve and the another open-close valve in a closing direction when it is determined that a rotational speed of the internal combustion engine is equal to or higher than an intermediate rotational speed and that a fuel injection amount of the internal combustion engine is equal to or smaller than a fuel injection amount required for autonomous operation thereof.

4. The open/close control device for an intake-exhaust communication circuit according to claim 3, wherein the inlet line of the turbine, into which the part of the intake air from the outlet line of the compressor is able to flow via the bypass line, is situated between the engine and the turbine.

* * * * *